United States Patent
Wohllebe et al.

(10) Patent No.: US 11,173,874 B2
(45) Date of Patent: Nov. 16, 2021

(54) OCCUPANT RESTRAINT SYSTEM IN A SELF-DRIVING VEHICLE

(71) Applicant: VOLKSWAGEN AKTIENGESELLSCHAFT, Wolfsburg (DE)

(72) Inventors: Thomas Wohllebe, Calberlah (DE); Florin Baiduc, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 17/001,623

(22) Filed: Aug. 24, 2020

(65) Prior Publication Data

US 2020/0384947 A1 Dec. 10, 2020

Related U.S. Application Data

(63) Continuation of application No. PCT/EP2019/054358, filed on Feb. 21, 2019.

(30) Foreign Application Priority Data

Feb. 22, 2018 (DE) .................... 10 2018 202 696.3

(51) Int. Cl.
*B60R 22/48* (2006.01)
(52) U.S. Cl.
CPC ...... *B60R 22/48* (2013.01); *B60R 2022/4816* (2013.01); *B60R 2022/4891* (2013.01)
(58) Field of Classification Search
CPC ............ B60R 22/48; B60R 2022/4883; B60R 2022/4891; B60R 2022/4808;
(Continued)

(56) References Cited

U.S. PATENT DOCUMENTS

| 6,184,785 B1 | 2/2001 | Midorikawa |
| 6,540,040 B1 * | 4/2003 | Patel .................. B60R 22/48 |
| | | 180/268 |

(Continued)

FOREIGN PATENT DOCUMENTS

| DE | 29812034 U1 | 10/1998 | |
| DE | 19916805 A1 * | 7/2000 | ............. B60R 22/48 |

(Continued)

*Primary Examiner* — James A English
*Assistant Examiner* — Caitlin Anne Miller
(74) *Attorney, Agent, or Firm* — Muncy, Geissler, Olds & Lowe, P.C.

(57) ABSTRACT

An occupant restraint system in a self-driving vehicle, in particular a robot taxi, for customer transport, wherein the occupant restraint system provides to the customer a restraint system that can be activated by the customer to be transported, and the occupant restraint system has an analysis unit via which a check is made in a safety check as to whether or not the restraint function is activated by the customer to be transported. The analysis unit prevents the vehicle from driving if an activated restraint function is absent. A diagnostic module, with which a functional diagnostic of the functionality of the occupant restraint system can be carried out independently of the safety check, is associated with the analysis unit. In the event that a fault is present, the diagnostic module initiates a suitable service action to remedy the fault.

10 Claims, 6 Drawing Sheets

(58) Field of Classification Search
CPC .... B60R 2022/4816; B60R 2022/4858; B60R 22/12; B60T 17/18
See application file for complete search history.

(56) References Cited

U.S. PATENT DOCUMENTS

| | | | |
|---|---|---|---|
| 8,634,980 B1* | 1/2014 | Urmson | B60T 17/221 |
| | | | 701/23 |
| 9,038,250 B2 | 5/2015 | Ai | |
| 9,043,073 B2* | 5/2015 | Ricci | G06F 3/0484 |
| | | | 701/29.4 |
| 9,658,620 B1 | 5/2017 | Urmson et al. | |
| 9,679,191 B1 | 6/2017 | Zhu et al. | |
| 9,791,861 B2* | 10/2017 | Keohane | G05D 1/0088 |
| 9,811,086 B1 | 11/2017 | Poeppel et al. | |
| 10,220,857 B2* | 3/2019 | Jones | B60W 10/20 |
| 10,607,422 B2* | 3/2020 | Rech | G05D 1/0291 |
| 10,889,262 B2* | 1/2021 | Liau | B60R 22/48 |
| 2004/0051293 A1* | 3/2004 | Go | B60R 22/48 |
| | | | 280/801.1 |
| 2015/0348335 A1 | 12/2015 | Ramanujam | |
| 2017/0004661 A1 | 1/2017 | Winiecki | |
| 2017/0136986 A1 | 5/2017 | Beutler | |

FOREIGN PATENT DOCUMENTS

| | | | | |
|---|---|---|---|---|
| DE | 10002378 A1 | 8/2000 | | |
| DE | 19948661 C1 | 1/2001 | | |
| DE | 10133759 A1 * | 1/2003 | ........... | B60R 21/272 |
| DE | 102005002866 B4 | 11/2007 | | |
| DE | 102010048597 A1 | 4/2012 | | |
| EP | 3176666 A1 | 6/2017 | | |

* cited by examiner

OCCUPANT RESTRAINT SYSTEM IN A SELF-DRIVING VEHICLE

This nonprovisional application is a continuation of International Application No. PCT/EP2019/054358, which was filed on Feb. 21, 2019, and which claims priority to German Patent Application No. 10 2018 202 696.3, which was filed in Germany on Feb. 22, 2018, and which are both herein incorporated by reference.

BACKGROUND OF THE INVENTION

Field of the Invention

The present invention relates to an occupant restraint system in a self-driving vehicle, as well as to a method for operating such an occupant restraint system.

Description of the Background Art

One area of application for self-driving vehicles relates to so-called robot taxis, which transport customers in continuous service. For this purpose, the robot taxi is booked for a trip by a customer after the robot taxi has completed a preceding customer transport. In order to ensure occupant safety, and also for liability reasons, the passenger of the self-driving vehicle must be belted in during the trip. If all the passengers in the vehicle are not belted in, the vehicle does not start driving.

A generic occupant restraint system provides to the customer to be transported a restraint function (which is to say a safety belt) that can be activated by the customer to be transported. The occupant restraint system additionally has an analysis unit by means of which a check is made in a safety check as to whether or not the restraint function is activated by the customer (passenger) to be transported. In the absence of an activated restraint function, the analysis unit prevents the vehicle from driving.

By way of example, the occupant restraint system can be a safety belt arrangement in which a safety belt in the fastened state is in a releasable plug-in connection through its latch plate with a safety belt buckle that is fixed to the vehicle. In this case, the safety check can be performed on the basis of a belt buckle sensor that senses whether or not the latch plate is inserted in the safety belt buckle. If the belt buckle sensor detects a latch plate inserted in the safety belt buckle, then the analysis unit recognizes that the restraint function, which is to say the safety belt, is activated. In this case, the self-driving vehicle starts driving.

Such a safety check does not take place until after the customer has booked the vehicle and is already located in the vehicle. The customer has thus already entered the reserved vehicle and does not recognize until that point that it is not possible to buckle up properly because of the faulty safety belt arrangement. Accordingly, the customer must exit the reserved robot taxi again and order another robot taxi, which is associated with losses in convenience and takes a great deal of time.

From DE 100 02 378 A1, which corresponds to U.S. Pat. No. 6,184,785, a seat belt device is known with a passenger detector and a webbing fastening detector. The two detectors have diagnostic capability with regard to a malfunction. The purpose of the passenger detector is to recognize the presence of a vehicle occupant on the seat. The webbing fastening detector (belt buckle sensor) recognizes whether or not the occupant is belted in.

SUMMARY OF THE INVENTION

It is therefore an object of the present invention to provide an occupant restraint system in a self-driving vehicle in which faults can be detected and corrected without losses in convenience for the customer to be transported.

The abovementioned conventional safety check, which merely detects whether or not a restraint function (which is to say the safety belt) is activated by the customer to be transported, cannot be carried out by means of the analysis unit according to the invention. Instead, a diagnostic module, with which a functional diagnostic of the functionality of the occupant restraint system can be carried out independently of the above safety check, is additionally associated with the analysis unit. In the event that a fault is present in the occupant restraint system, the diagnostic module initiates a suitable service action. Such a service action can be, by way of example, an automatic service trip of the vehicle to a workshop or a request for service staff in order to remedy the fault in the occupant restraint system of the self-driving vehicle.

In one technical implementation, therefore, before the robot taxi travels to a new customer, which is to say after every trip, a determination is made by means of the diagnostic module as to whether the restraint device is fully operational and the next customer can enter the vehicle to take a trip. It is crucial here that the functional diagnostic performed by the diagnostic module takes place at a time prior to the safety check performed by the analysis unit. The functional diagnostic is thus to be performed specifically during a change of customers between one customer and a next customer, and especially preferably at a point in time when the vehicle is not yet made available to the next customer, which is to say that the next customer is not yet located in the vehicle. In this way it is possible to reliably ensure that a self-driving vehicle with a properly functional occupant restraint system can always be made available to the next customer.

According to the invention, therefore, the self-driving vehicle is made available for further customer transport only after the diagnostic module diagnoses a fault-free occupant restraint system of the vehicle.

The occupant restraint system can be, for example, a safety belt arrangement with a seat belt retractor, a belt strap, a latch tongue, an anchor fitting, and a safety belt buckle. In the fastened state, the safety belt is inserted by means of its latch plate into the safety belt buckle in a releasable plug-in connection, said buckle being fixed to the vehicle (or fixed to the seat).

In such a safety belt arrangement, the analysis unit determines (as already known from the prior art) in the safety check whether or not the safety belt has been fastened by the customer to be transported. In the event the safety belt is fastened, the analysis unit enables the vehicle to start driving.

The abovementioned safety check can preferably be carried out by means of a belt buckle sensor that has a signal connection to the analysis unit. The belt buckle sensor senses whether or not the latch plate is inserted in the safety belt buckle. When the latch plate is properly inserted, the analysis unit recognizes that the customer to be transported has activated the restraint function (which is to say the safety belt).

In contrast, the diagnostic module can have a signal connection to at least one diagnostic sensor, on the basis of which the diagnostic module determines in the course of the functional diagnostic whether or not the safety belt arrangement is fault-free.

The diagnostic sensor can be a belt slot sensor. This sensor senses whether or not a freedom of movement is present in the insertion slot of the safety belt buckle and, in particular, continuously over the entire insertion depth of the insertion slot in the safety belt buckle. Such a freedom of movement is not present, for example, when the opening of the belt buckle insertion slot is blocked with chewing gum or with another small object or when, for example, a small object (such as a coin) has fallen into the insertion slot of the safety belt buckle.

Alternatively and/or in addition, the diagnostic sensor can be a belt strap sensor that senses whether or not damage to the belt strap of the safety belt is present. In one technical embodiment, electrically conductive threads can be woven into the belt strap, and the belt strap sensor can be a resistance sensor that detects an electrical resistance of the interwoven electrically conductive threads over at least a section of the length of the belt strap. In this case, belt strap damage can be inferred from a detected resistance change.

Alternatively and/or in addition, the diagnostic sensor can also be an optical sensor, specifically a passenger compartment camera, by means of which such belt strap damage can be sensed. Alternatively and/or in addition, the diagnostic sensor can also be a belt extension sensor, with which it is determined whether or not the safety belt has been rolled back up properly after use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitive of the present invention, and wherein.

DETAILED DESCRIPTION

Figure 1:
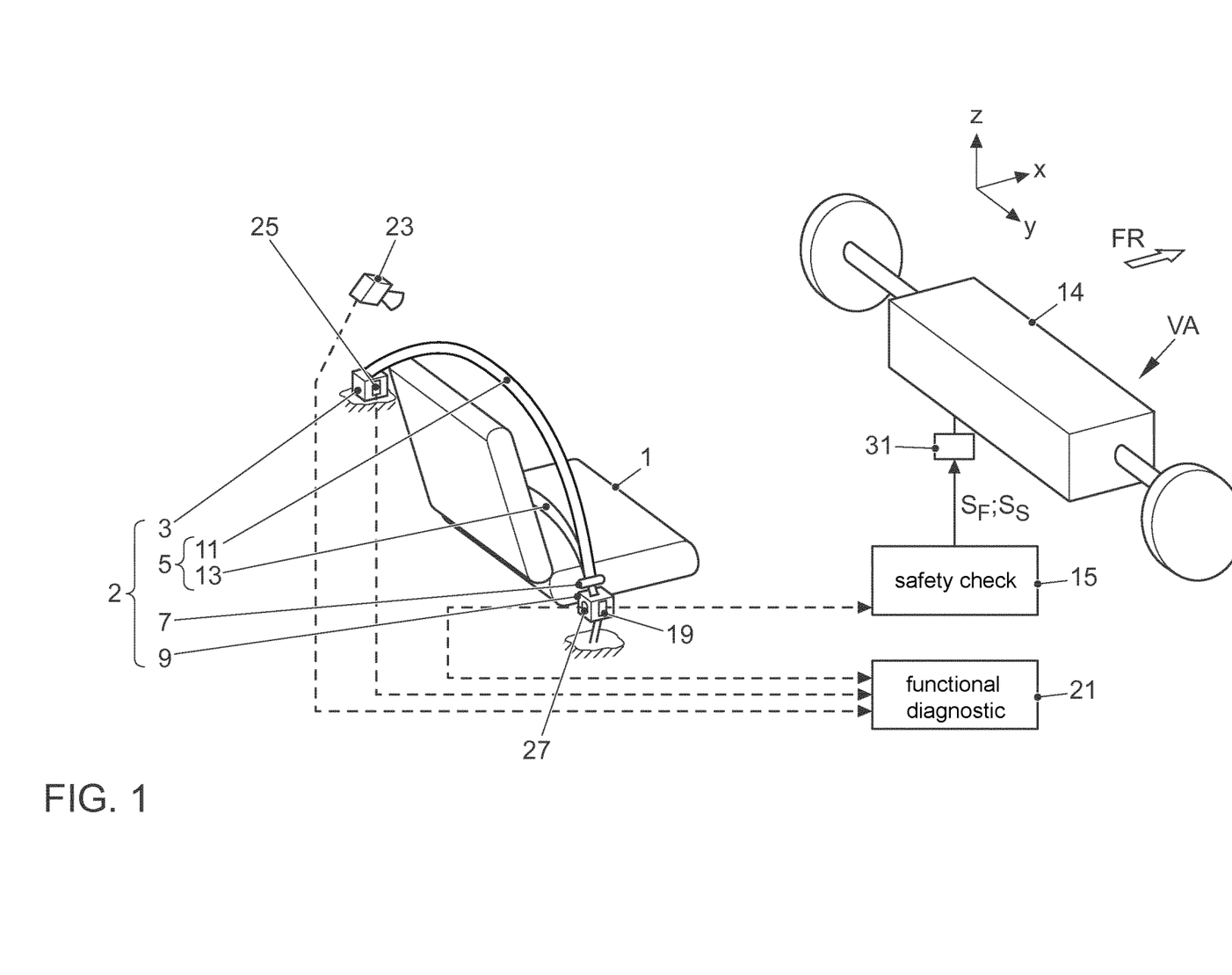
FIG. 1 shows an occupant restraint system of a self-driving vehicle in a roughly schematic perspective representation.

In FIG. 1, a passenger compartment of a self-driving vehicle is sketched in a roughly schematic partial perspective view to the extent necessary for understanding the invention. Accordingly, the passenger compartment has a vehicle seat with a safety belt arrangement 2, which represents an occupant restraint system within the meaning of the invention. The safety belt arrangement 2 is constructed in a manner known per se from a safety belt retractor 3, which is built into a vehicle pillar for example, a three-point safety belt 5, a latch tongue 7, and a safety belt buckle 9 that is fixed to the vehicle. The three-point safety belt 5 is divided into a shoulder belt portion 11 and a lap belt portion 13, which transition into one another as a single piece at the latch tongue 7. In FIG. 1, the safety belt 5 is shown in the fastened state, in which the safety belt 5 secures a vehicle occupant (not shown) in the vehicle seat 1. The self-driving vehicle sketched in FIG. 1 additionally has at its front axle VA a power plant 14, for example an electric machine, which drives the front wheels of the vehicle.

As is additionally evident from FIG. 1, an electronic analysis unit 15 that is indicated as a block diagram is associated with the safety belt arrangement 2, by means of which it is possible to carry out a safety check (described further below) of the safety belt arrangement 2. The analysis unit 15 has a signal connection to a belt buckle sensor 19 built into the safety belt buckle 9. Also associated with the analysis unit 15 is a diagnostic module 21, which has a signal connection to different diagnostic sensors, namely to a passenger compartment camera 23, a belt extension sensor 25 built into the safety belt retractor 3, a belt slot sensor 27 built into the safety belt buckle 9, and a belt strap damage sensor 24/37, which is not drawn in FIG. 1 for reasons of clarity, but is shown in detail in FIGS. 7 and 8.

Figure 2:
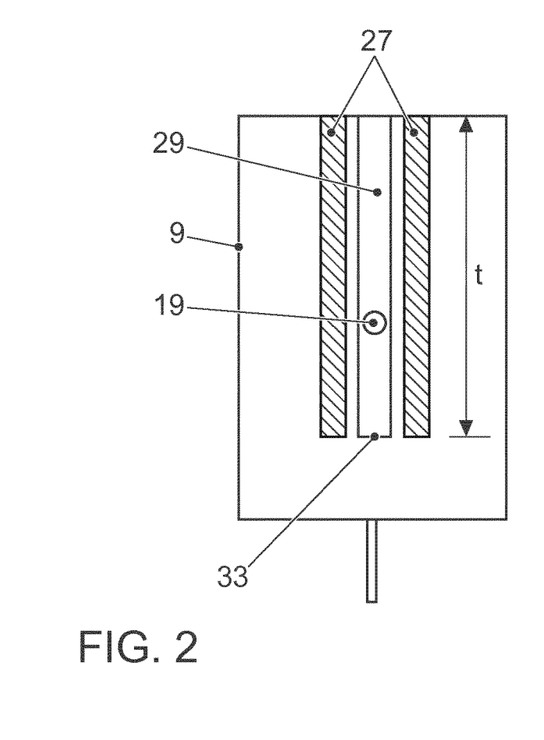
FIGS. 2 to 6 show different examples of a safety belt buckle.
Figure 3:
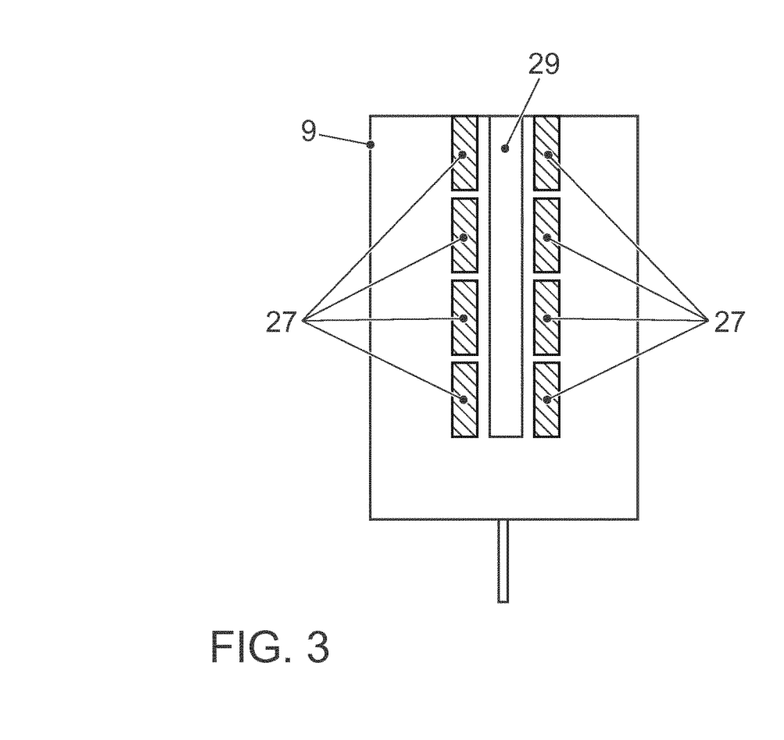

In FIG. 2, the safety belt buckle 9 is shown in a schematic partial sectional view. Accordingly, the safety belt buckle 9 has an insertion slot 29 that is open at the top, into which the latch plate 7 can be inserted. The insertion slot 29 extends over a slot depth t into the safety belt buckle 9. In FIG. 2, capacitive sensor elements are positioned on both sides of the slot walls continuously over the full slot depth t, forming the belt slot sensor 27, with which it is possible to check freedom of movement of the insertion slot 29. A capacitance is measured in the insertion slot 29 with the capacitive sensor elements. When the insertion slot 29 is empty, the capacitance has a first measured value. When the latch plate 7 is inserted (known material, uniform insertion depth), the capacitance measured by the capacitive sensor elements has a second value. In the case of all measured values that deviate from the first or second value, freedom of movement of the insertion slot 29 is not assured.

In addition, the belt buckle sensor 19 is indicated in FIG. 2. The belt buckle sensor 19 can, by way of example, be a mechanical switch that projects into the insertion slot 29 in a rest switch position when the latch plate 7 is not inserted, and is displaced into a different switch position when the latch plate 7 is inserted. When this different switch position is detected, the analysis unit 17 recognizes that the latch plate 7 is inserted in the safety belt buckle 9.

Prior to starting a customer transport, the analysis unit performs a safety check in which a determination is made on the basis of the signal transmitted by the belt buckle sensor 19 as to whether or not the safety belt 5 has been fastened by the customer to be transported. If it is recognized in the analysis unit 17 that the safety belt 5 has been fastened by the customer to be transported, an enable signal $S_F$ is generated with which power electronics 31, for example, of the electric motor 14 can be controlled in order to enable the vehicle to start driving. If the analysis unit 17 instead recognizes that the customer to be transported has not yet fastened the safety belt 5, then a disable signal $S_S$ is generated in the analysis unit 17, with which signal the power electronics 31 of the electric machine 14 are controlled in order to prevent the vehicle from starting to drive.

According to the invention, an additional functional diagnostic, which is carried out by means of the diagnostic module 21, takes place at a time prior to this safety check.

The functional diagnostic is performed here during a change of customers between an already transported customer and a next customer, and specifically when the next customer is not yet present in the vehicle, which is to say that the vehicle is not yet made available to the next customer while performing the functional diagnostic. In the functional diagnostic performed by the diagnostic module 21, a determination is made on the basis of the sensor signals of the diagnostic sensors 23, 24, 25, 27 as to whether or not fault-free functionality of the safety belt arrangement 2 is present. For this purpose, the belt slot sensor 27 detects whether or not freedom of movement is present in the insertion slot 29, namely continuously over the entire insertion depth t of the insertion slot 29 in the safety belt buckle 9. If such freedom of movement is not present (for example, because of a blockage of the insertion slot 29 by means of a small object), a corresponding sensor signal occurs, on the basis of which the diagnostic module 21 recognizes the presence of a fault in the safety belt arrangement 2. In this event, the diagnostic module 21 initiates suitable service actions, for example a service trip to the workshop or the request for service staff, to remedy the fault.

Alternatively and/or in addition, in FIG. 1 the belt strap status of the safety belt 5 is checked optically with the aid of the passenger compartment camera 23. If the passenger compartment camera 23 senses belt strap damage, a corresponding sensor signal occurs, on the basis of which the diagnostic module 21 likewise recognizes the presence of a fault. Alternatively and/or in addition, it is possible to sense by means of the belt extension sensor 25 whether or not the safety belt 5 has been rolled up properly after use. If the roll-up is faulty, a corresponding sensor signal likewise occurs, on the basis of which the diagnostic module 21 recognizes a fault in the safety belt arrangement 2. Alternatively and/or in addition, a check as to whether or not belt strap damage is present can also be performed by means of the resistance sensor 24 during the functional diagnostic.

Figures 4, 5:
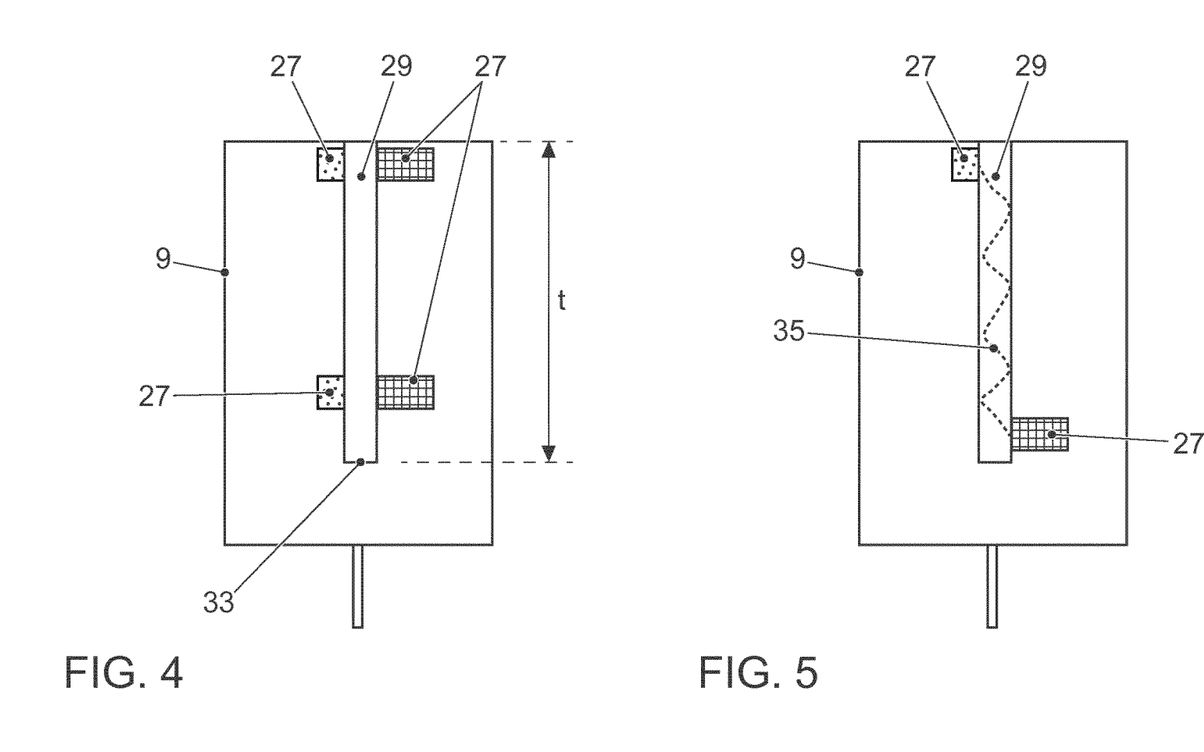

Additional variant embodiments of the belt slot sensor 27 are outlined below on the basis of FIGS. 3 to 6: Thus, according to FIG. 3, the belt slot sensor 27 is not constructed of only two capacitive sensor elements arranged at the sides of the insertion slot 29, but instead of a multiplicity of capacitive sensor segments, thus making possible an even more accurate capacitive measurement. In FIG. 4, a sensor detection of freedom of movement that is fully continuous over the insertion depth t is dispensed with. Instead, in FIG. 4 an infrared sensor with associated infrared emitter is positioned both at the upper opening region and at the lower slot bottom 33 of the insertion slot 29. If a small object, for example, is lodged in the opening of the insertion slot 29, the upper infrared sensor recognizes this upon interruption of the beam path. But since it is not possible to distinguish whether the object has been removed again or whether a smaller object (such as a coin) has fallen down in the slot, the additional lower infrared sensor is necessary. Freedom of movement in the insertion slot 29 is then present when neither of the two infrared sensors supplies a corresponding signal.

In FIG. 5, an infrared sensor is arranged in the region of the slot bottom 33 of the insertion slot 29, which sensor has a signal connection (which is to say, reflecting infrared beam 35) to an infrared emitter arranged in the upper opening region of the insertion slot 29. As an alternative to the preceding sensor concept from FIG. 4, here the entire insertion slot 29 can be monitored over its entire insertion depth t with only a single infrared sensor.

Figure 6:
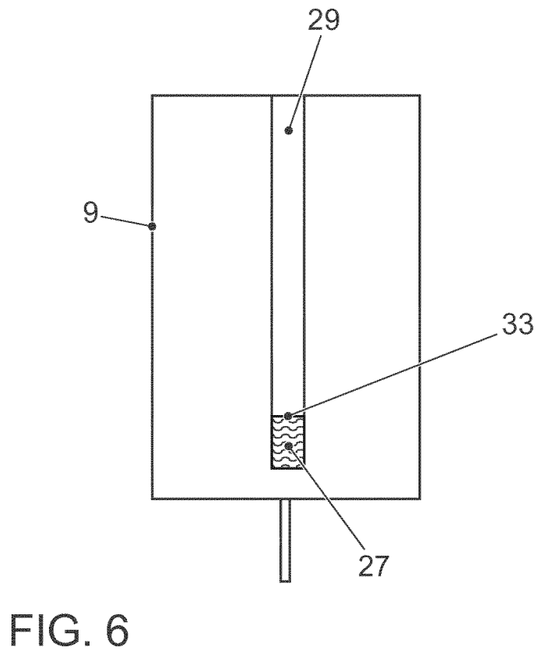

In FIG. 6, an ultrasonic sensor is positioned at the slot bottom 33 of the insertion slot 29, with which sensor the freedom of movement of the insertion slot 29 can be monitored over its entire insertion depth t.

As mentioned above, a passenger compartment camera 23 is used by way of example in FIG. 1 as a belt strap sensor, with the aid of which it is possible to check the belt strap 5 for possible damage. Such possible damage may be cuts, holes, or burn holes, for example. Alternatively and/or in addition to the passenger compartment camera 23 shown in FIG. 1, such damage to the belt strap 5 can also be recognized with the aid of a resistance sensor 24 shown in FIGS. 7 and 8. For this purpose, in FIGS. 7 and 8 electrically conductive threads 37 are woven into the relevant belt strap 5. These may be metallic threads, for example, or also conductive polymer threads. The advantage of polymer threads is that they are destroyed at relatively high temperatures. This can be used to recognize burns/melting on the belt strap.

Figure 7:
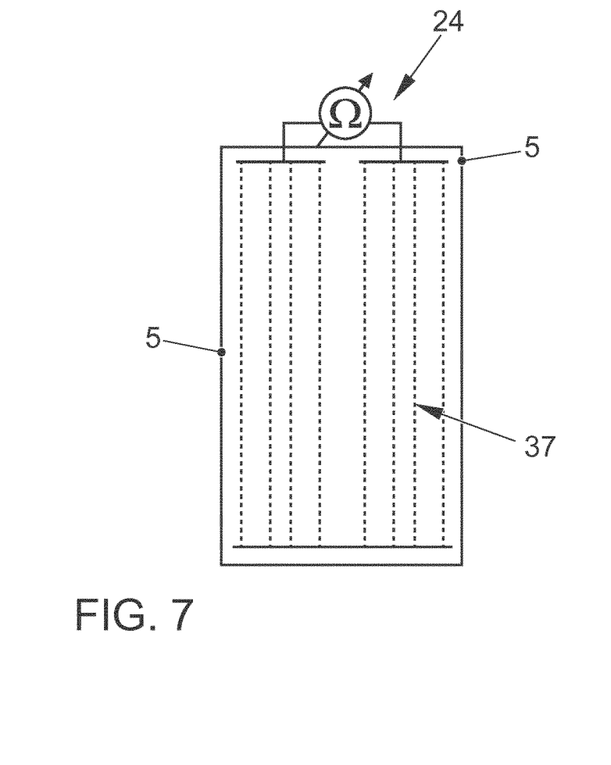
FIGS. 7 and 8 show schematic representations of a belt strap of the occupant restraint system.
Figure 8:
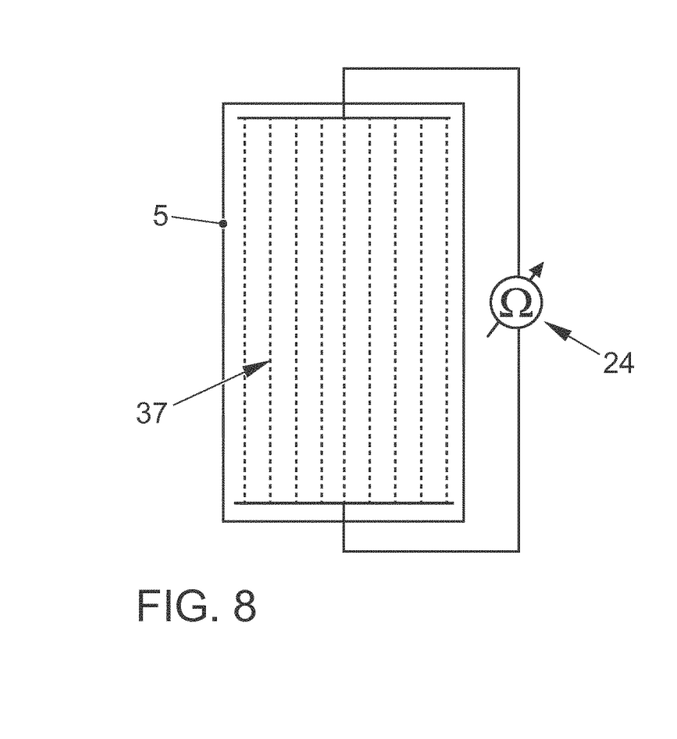

By way of example, a resistance measurement takes place in FIG. 7 at just one end of the belt strap 5 (for example, at the end stop or in the safety belt retractor 3). As an alternative, a resistance measurement takes place between the two ends of the belt strap in FIG. 8. When the threads in the belt strap 5 are damaged, the measured resistance changes. Accordingly, a fault signal can be routed to the diagnostic module 21.

Figure 9:
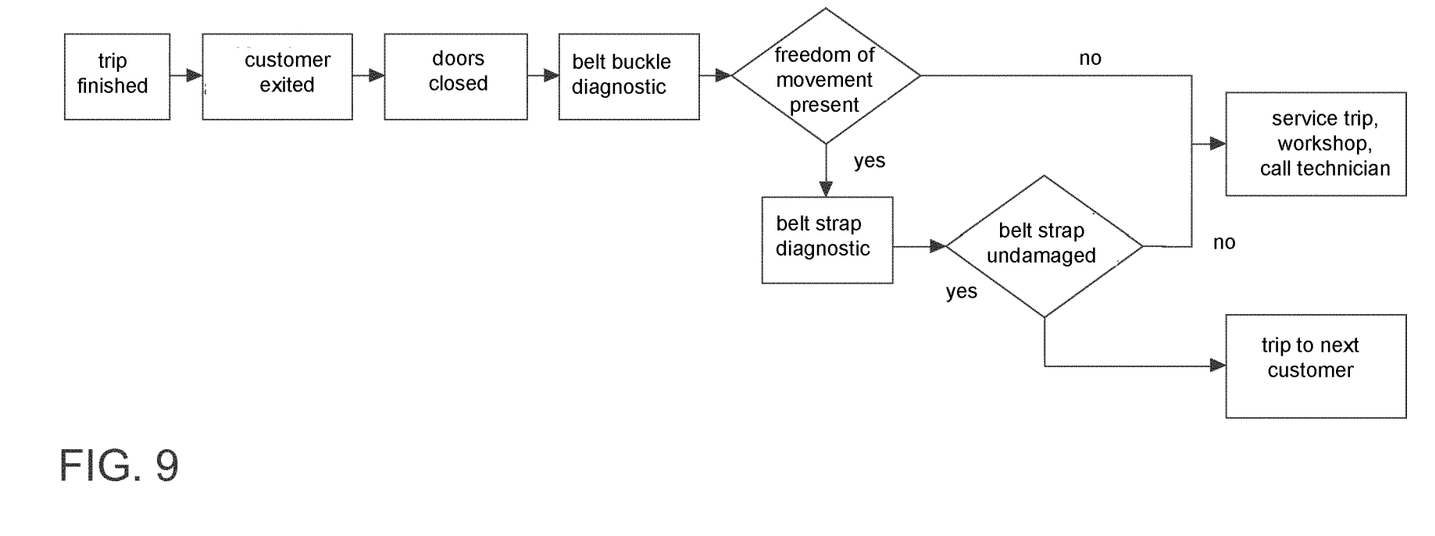
FIG. 9 is a block diagram in which process steps for operation of the occupant restraint system are illustrated.

A preferred sequence of the checking of the safety belt arrangement 2 is shown schematically on the basis of FIG. 9: Accordingly, first a customer trip is finished, whereupon the transported customer exits and the vehicle doors close. Prior to transporting a next customer, a belt buckle diagnostic is first carried out by means of the diagnostic module 21, in which the belt slot sensor 27 checks freedom of movement of the insertion slot 29 of the safety belt buckle 9.

If freedom of movement is present, a belt strap diagnostic takes place (afterwards in process terms). If an undamaged belt strap 5 is present, the self-driving vehicle is made available to a next customer. In contrast, if a damaged belt strap 5 is present, service actions are initiated. Such service actions are also initiated if deficient freedom of movement is discovered in the belt buckle diagnostic.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An occupant restraint system in a self-driving vehicle for customer transport, wherein the occupant restraint system provides a restraint function to a customer that is activatable by the customer to be transported, the occupant restraint system comprising:
   an analysis unit via which a check is made in a safety check as to whether or not the restraint function is activated by the customer to be transported, the analysis unit preventing the vehicle from driving if an activated restraint function is absent;
   a diagnostic module with which a functional diagnostic of the functionality of the occupant restraint system is carried out independently of the safety check, the diagnostic module being associated with the analysis unit, wherein the diagnostic module, in the event that a fault is present in the occupant restraint system, initiates a suitable service action to remedy the fault, and wherein the functional diagnostic performed by the diagnostic module takes place at a time prior to the safety check performed by the analysis unit, and wherein, the functional diagnostic takes place during a change of customers between an already transported customer and a next customer, and at a point in time when the vehicle is not yet made available to the next customer, such that the next customer is not yet located in the vehicle.

2. The occupant restraint system according to claim 1, wherein the diagnostic module makes the vehicle available to the next customer for further customer transport when a fault-free occupant restraint system is present.

3. The occupant restraint system according to claim 1, wherein the occupant restraint system is a safety belt arrangement with a safety belt, which in a fastened state is in a releasable plug-in connection through a latch plate with a safety belt buckle that is fixed to the vehicle, and wherein the analysis unit determines, in the safety check, whether or not the safety belt has been fastened by the customer to be transported.

4. The occupant restraint system according to claim 3, wherein the analysis unit has a signal connection to a belt buckle sensor that senses whether or not the latch plate is inserted in the safety belt buckle, and wherein, in the event the latch plate is inserted, the analysis unit recognizes that the customer to be transported has activated the restraint function.

5. The occupant restraint system according to claim 3, wherein the diagnostic module has a signal connection to at least one diagnostic sensor on the basis of which the diagnostic module determines in the functional diagnostic whether or not the safety belt arrangement is fault-free.

6. The occupant restraint system according to claim 5, wherein the at least one diagnostic sensor includes a belt slot sensor that senses whether or not a freedom of movement is present in an insertion slot of the safety belt buckle, and, wherein, the belt slot sensor continuously senses over an entire insertion depth of the insertion slot in the safety belt buckle.

7. The occupant restraint system according to claim 5, wherein the at least one diagnostic sensor includes a belt strap sensor that senses whether or not damage to a belt strap of the safety belt is present.

8. The occupant restraint system according to claim 7, wherein electrically conductive threads are woven into the belt strap, and wherein the belt strap sensor is a resistance sensor that detects an electrical resistance of the electrically conductive threads over at least a section of a length of the belt strap and determines belt strap damage from a detected resistance change.

9. The occupant restraint system according to claim 7, wherein the belt strap sensor is a passenger compartment camera that senses belt strap damage, and/or wherein the at least one diagnostic sensor includes a belt extension sensor that determines whether or not the safety belt has been rolled up or retracted properly after use.

10. The occupant restraint system according to claim 1, wherein the service action is a service trip to a workshop or a request for service staff.

* * * * *